(12) United States Patent
Nassar et al.

(10) Patent No.: US 8,918,497 B2
(45) Date of Patent: Dec. 23, 2014

(54) EMAIL SYSTEM LATENCIES AND BANDWIDTHS

(75) Inventors: Aladdin A. Nassar, Santa Clara, CA (US); Tze Meng Lee, San Carlos, CA (US)

(73) Assignee: Microsoft Corporation, Redmond, WA (US)

( * ) Notice: Subject to any disclaimer, the term of this patent is extended or adjusted under 35 U.S.C. 154(b) by 857 days.

(21) Appl. No.: 12/705,614

(22) Filed: Feb. 14, 2010

(65) Prior Publication Data

US 2011/0202608 A1 Aug. 18, 2011

(51) Int. Cl.
*G06F 15/16* (2006.01)
*G06F 15/173* (2006.01)
*H04L 12/26* (2006.01)
*G06Q 10/10* (2012.01)
*H04L 12/58* (2006.01)

(52) U.S. Cl.
CPC .......... *G06Q 10/107* (2013.01); *H04L 43/0852* (2013.01); *H04L 43/0882* (2013.01); *H04L 12/58* (2013.01)
USPC .......................................... 709/224; 709/206

(58) Field of Classification Search
USPC ........................................ 709/206, 223–224
See application file for complete search history.

(56) References Cited

U.S. PATENT DOCUMENTS

| | | | |
|---|---|---|---|
| 7,216,168 B2 * | 5/2007 | Merriam | 709/224 |
| 7,342,923 B2 | 3/2008 | Botvich | |
| 7,474,631 B2 | 1/2009 | Dube et al. | |
| 2004/0199592 A1 * | 10/2004 | Gould et al. | 709/206 |
| 2006/0077960 A1 | 4/2006 | Chang et al. | |
| 2007/0185986 A1 * | 8/2007 | Griffin et al. | 709/224 |
| 2009/0204704 A1 * | 8/2009 | Muret et al. | 709/224 |
| 2010/0262646 A1 * | 10/2010 | Lee et al. | 709/203 |
| 2011/0119370 A1 * | 5/2011 | Huang et al. | 709/224 |

OTHER PUBLICATIONS

Werner et al., "Bandwidth and Latency Considerations for Efficient SOAP Messaging"—Published Date: 2005 http://www.infosci-journals.com/downloadPDF/pdf/ITJ3077_UUZgUZ76aT.pdf.

He; Congchun "WSDAF: A Dynamically Adaptive Framework for Scalable Web Services"—Published Date: Mar. 16, 2004, http://www.cs.nyu.edu/congchun/pub/thesis_proposal.pdf.

Tian et al., "Performance Considerations for Mobile Web Services"—Published Date: 2003 http://www.tii.se/~thiemo/ASWN2003.pdf.

(Continued)

*Primary Examiner* — Shirley Zhang
(74) *Attorney, Agent, or Firm* — Tom Wong; Jim Ross; Micky Minhas (57) ABSTRACT

One or more techniques and/or systems are disclosed for measuring a client's network latency and the client's connection bandwidth. A network latency is determined by adding a randomly generated variable to a browser query string for a get request for a test file on a remote server, where the test file fits in one response packet. A first amount of time it takes for the test file to be received by the browser from when the get request is sent is determined and used to determine the network latency between the client and remote server. A connection bandwidth is determined by determining a second amount of time it takes for an email response to be received by the browser for an email request from the browser to a remote server. The size of the response is identified and combined with the second time to determine the connection bandwidth.

20 Claims, 8 Drawing Sheets

(56) References Cited

OTHER PUBLICATIONS

Yang et al., "Web Browsing Performance of Wireless Thin client Computing"—Published Date: 2003 http://mirandainfotech.co.in/yahoo_site_admin/assets/docs/thin_client_wireless.133233425.pdf.

Gummadi et al., "King: Estimating Latency between Arbitrary Internet End Hosts"—Published Date: 2003 http://www.cs.toronto.edu/~stefan/publications/imw/2002/king.pdf.

* cited by examiner

FIG. 9

EMAIL SYSTEM LATENCIES AND BANDWIDTHS

BACKGROUND

Some embodiments of email services comprise Internet Service Provider (ISP) based email, such as for email that routes to a particular ISP (e.g., AT&T, Sprint, Verizon), and Internet-based email, such for email that routes to a particular website (e.g., Hotmail, Yahoo, AOL). Internet-based email services can typically provide email service to users from any connection to the service (e.g., user's desktop at home or work, a roaming laptop using a hotspot, a mobile device wireless phone connection).

These Internet-based email services typically provide the user with a same experience regardless of the user's location. Therefore, a user checking their email at work may have the same experience when they check their email on their laptop at a coffee shop while on vacation. Email services can comprise an infrastructure of resources that are linked to the Internet, such as servers, server farms, and data centers. These server systems, along with other components can allow for the email service to be used world-wide.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While users may access their email from anywhere in the world, not all users of the service may have a same network latency (e.g., time it takes for information to be retrieved from a remote server) and connection bandwidth (e.g., how much data can be sent over a connection at any one time). These metrics may be different for users depending on local, regional or country-wide resources, including locations of the servers, connections, and types of servers.

There are a plurality of websites that allow users to gauge their up/down bandwidths and network latencies on demand, one user at a time. That is, a user may direct their browser to one of these websites, where a dummy file is uploaded to a selected server (e.g., in a chosen remote location for the website), and another is downloaded to the client from the remote server. These services then can provide an estimated connection (throughput) speed and network latency based on the one time upload/download. However, these services require a user to actively seek the site and activate the service. Further, these services do not provide for using an existing email infrastructure to inventory its last-mile, real, end-user bandwidths and network latencies from around the world using e-mails sent/received and attachments up/downloaded.

Accordingly, as provided herein, the fact that an email service can provide for users sending/receiving 100's of millions of e-mails and uploading/downloading of millions of attachments a day from around the world can be taken advantage of. For example, by timing these transactions real end-user, last-mile throughputs (bandwidths) up/downstream can be measured. Further, by timing how long it takes to fetch very small test file, such as an image (e.g., like a network Ping) effective network latencies can be measured to different domains in the email infrastructure. The statistically significant measurements of bandwidths and network latencies can be used for a variety of purposes. Instrumentation built into the browser on a client can capture the measurements for different domains, along with the anonymous IP address, which can be grouped into ranges where possible, so that no personally identifiable information is stored.

In one embodiment for measuring a client's network latency and the client's connection bandwidth, a network latency can be determined by adding a randomly generated variable to a browser query string for a get request for a test file to mitigate a cache retrieval of the test file, where the test file is on a remote server and fits in one response packet. Further, a first amount of time, such as a round trip time for the request, that is how long it takes for the test file to be received by the browser from when the get request is sent is determined and used to determine the network latency between the client and remote server (e.g., which may be a function of a network distance between a user (browser) and server and a network infrastructure and congestion in the country comprising the infrastructure). Additionally, a connection bandwidth can be determined by determining a second amount of time it takes for an email response to be received by the browser for an email request from the browser to a remote server. The size of the response is identified, such as a size of an email attachment, and combined with the second time to determine the connection bandwidth, such as in megabytes per second.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1:
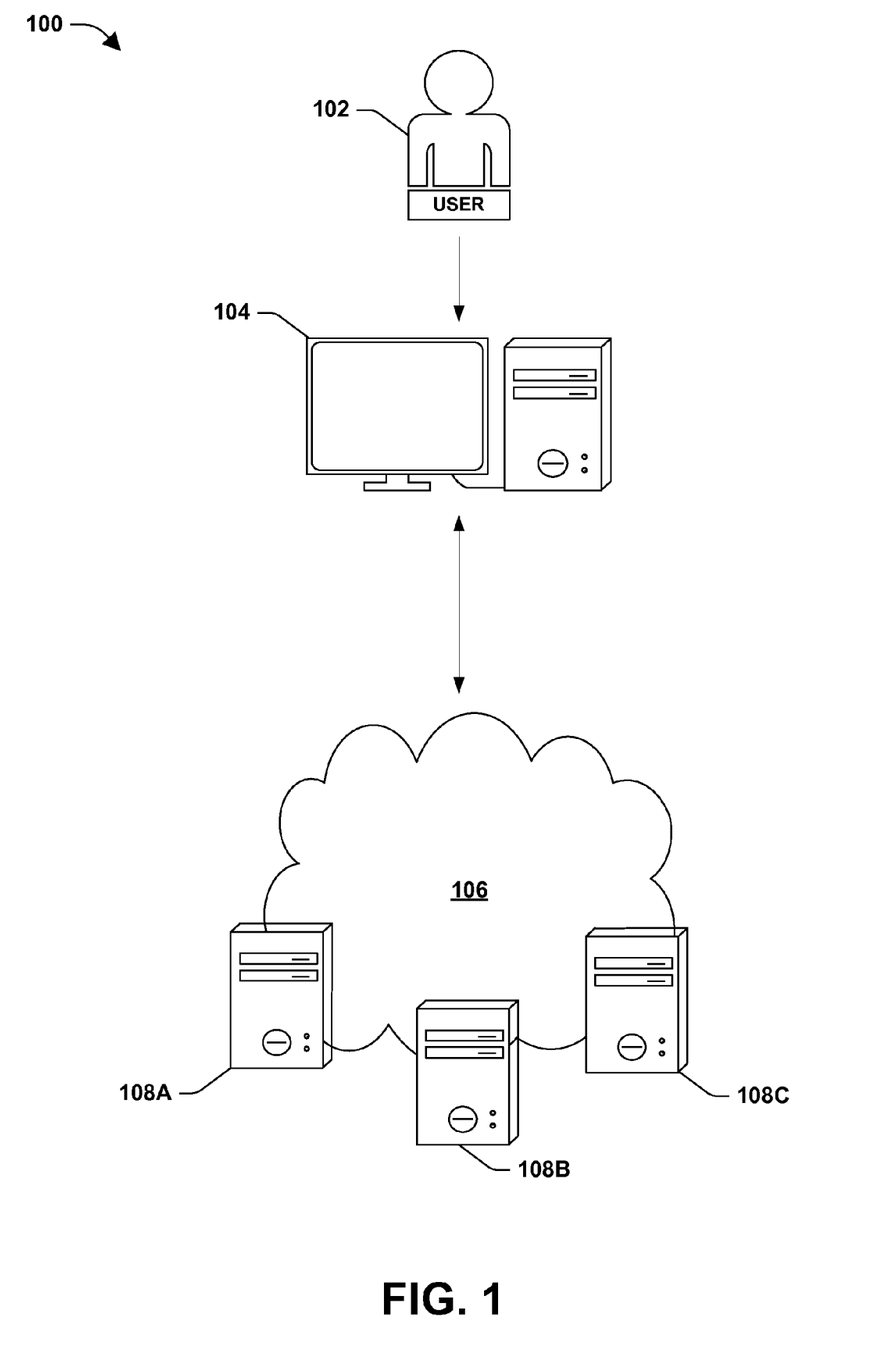
FIG. 1 illustrates an exemplary environment where of one or more of the techniques and/or systems described herein may be implemented.

FIG. 1 illustrates an exemplary environment 100 where of one or more of the techniques and/or systems described herein may be implemented. An Internet-based email service can provide email service to a user 102 from any connection to the service, such as from a desktop 104 at the user's home or work, a laptop connected via a hotspot, or a handheld device connecting over a mobile phone connection, for example. Further, as an example, the email service typically provides a same user experience regardless of how or where the user connects. A user checking their email at work typically has the same experience when they check their email on their smart phone while at a convention in another country.

The email service comprises an infrastructure of servers 108, for example, which are linked to the Internet 106. The infrastructure can comprise server farms, regional data centers, and other components that allow for the email service to be used world-wide. However, respective users of the service may not always have a same network latency (e.g., time it takes for information to be retrieved from a remote server) and connection bandwidth (e.g., how much data can be sent over a connection at any one time). This may be due to local, regional or country-wide resources, including locations of the servers, connections, types of servers and/or network routing and conditions.

A method may be devised that provides for measuring network latencies from an end-user's computer to different domains on the internet, such as in an existing, Internet-based, email infrastructure. Further, the method may be able to provide for measuring upstream/downstream network bandwidths to the different domains on the internet, such as in the existing, Internet-based, email infrastructure. In this way, for example, effective infrastructure planning, evaluation, and resource assignment can be managed more effectively using these latency and bandwidth measurements.

Figure 2:
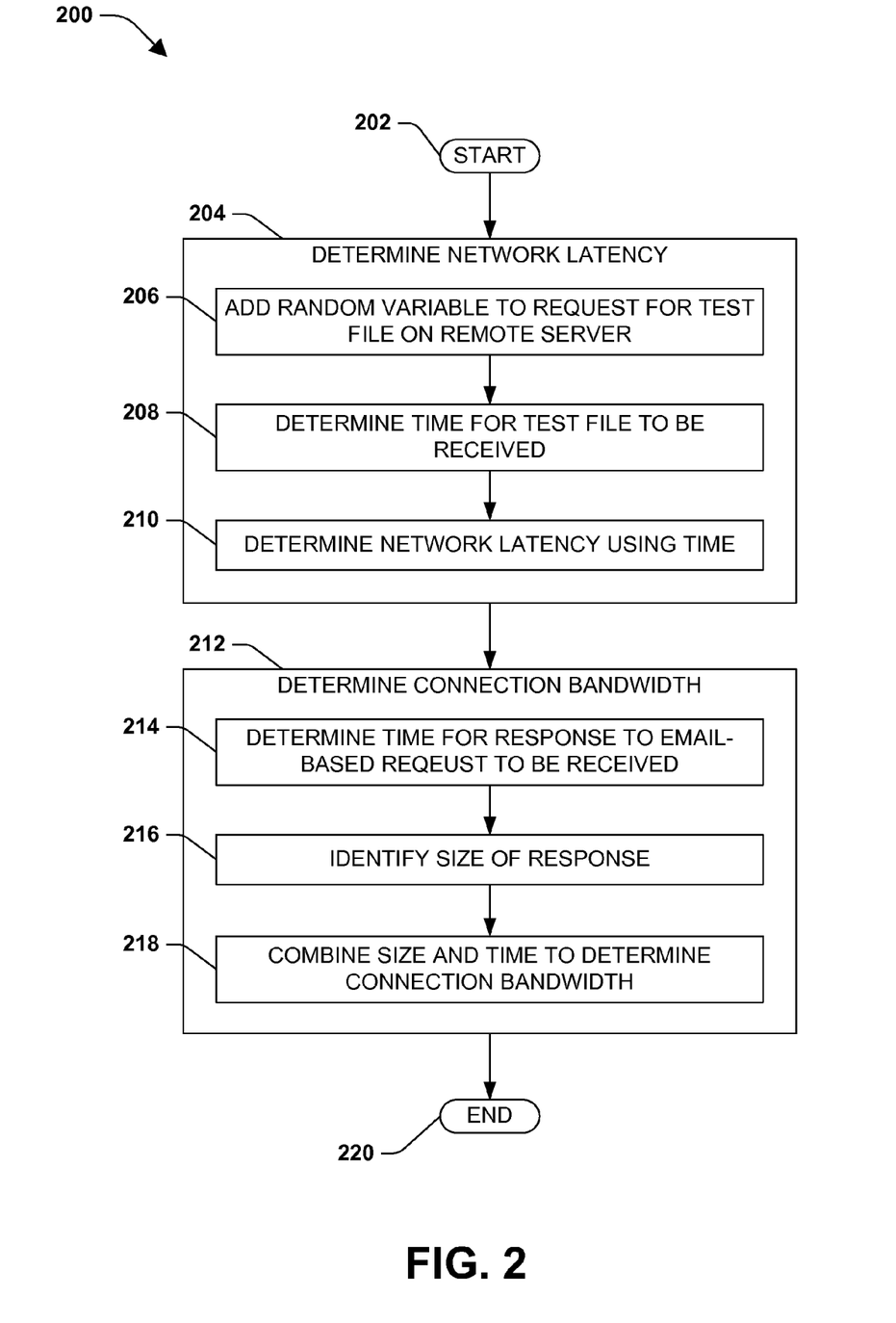
FIG. 2 is a flow diagram of an exemplary method for measuring a network latency and connection bandwidth.

FIG. 2 is a flow diagram of an exemplary method 200 for measuring a client's network latency and the client's connection bandwidth. The exemplary method 200 begins at 202. A network latency, such as for a connection between the client and a remote server in a domain of a network comprised in an email infrastructure, is determined, at 204. That is, for example, the client may be accessing a remote email server on the Internet, such as to retrieve (e.g., read) or send emails. In this example, a network latency for the email system can be determined by determining a network latency (e.g., a ping time) between the client and remote server, and determining a plurality of network latencies between a plurality of clients and a plurality of remote servers in the email system. In one embodiment, the plurality of network latencies can be used to determine a network condition for the email system, such as for a particular area, Internet service provider (ISP), region, country, or entire system.

Determining the network latency comprises adding a randomly generated variable to a browser query string for a "get" request for a test file hosted on a remote server, at 206. In this embodiment, the test file targeted by the get request fits on one response packet, and the randomly generated variable added to the request mitigates the client retrieving the test file from local cache. That is, for example, when a browser located on a client generates a request to go and get a file located on a remote server, typically, the client first looks to its local cache for a copy of the file, as retrieving the file from the local cache typically takes less time than retrieval from the remote server. Further, a local cached copy of the file may be found when the file has previously been retrieved from the remote server. For example, when a website is accessed by the browser, the browser may store the file (e.g., some background image used) when accessing the website in the local cache.

In one embodiment, adding the randomly generated variable to the browser query string changes the get request. Therefore, for example, when the client searches its local cache using the request (e.g., using a lookup table) none of the locally cached files will match the browser query string due to the added variable. In this way, in this embodiment, the client may be forced to retrieve the requested test file from the remote server. Further, forcing the client to retrieve the test file from the remote server allows the network latency between the client and the remote server to be determined.

Additionally, in this embodiment, the test file is not limited to any particular embodiment, merely that the file is able to fit in one response packet. That is, in one embodiment, the test file may comprise an image file small enough in size to fit a single packet response to the request (e.g., a tiny image file much less than 1 Kb in size). In this way, for example, receiving a response to the request does not utilize significant network resources on the client, and likely goes unnoticed by the client (e.g., or user of the email service). Also, the remote server may be able to respond (e.g., retrieve from storage and send) to the request quickly due the small file's size.

At 208, in the exemplary method 200, a first amount of time it takes for the test file to be received by the browser, from when the "get" request is sent, is determined. For example, when the client sends out the request for the test file a timer can be started, and when the browser receives the test file from the remote server the timer can be stopped. In this example, the time recorded by the timer can comprise the amount of time it took for the request to reach the remote server, the time it took for the remote server to retrieve the test file (e.g., from memory or storage) and send it back to the client, and the amount of time it took for the response with the test file to reach the client. Further, in one embodiment, the browser receiving the test file can comprise the browser loading the file (e.g., loading the image file in the browser).

At 210, the first amount of time is used to determine the network latency. For example, the amount of time recorded by the timer can be used to determine the network latency between the client and the remote server from where the test file was retrieved. In this example, if the timer records one half a second from the time the request is sent until the time the tiny test file (e.g., that fits in one response packet) is retrieved, the network latency can be determined to be 500 milliseconds.

In one embodiment, as described above, a plurality of network latencies can be determined and a network latency can be derived from the plurality of network latencies. For example, network latencies between clients and remote servers in a regional data center that serves a region can be determined. In this example, the network latency for the regional data center can be determined by taking an average of the network latencies. A network latency determination, in turn, may be used to determine a location of the client relative to the remote server. That is, for example, if a known first client location (or plurality of client locations) provides a particular network latency for a given server, a location of a second client relative to the second server may be estimated based on the network latency.

In one embodiment, this information may be useful to determine whether a particular user is a legitimate or one who has maliciously hijacked the client, for example. In this example, if a user logs onto the email service and accesses an email server from a first location, then within a short period of time logs onto the email service from another location to which they could not have been located (e.g., too far away to get there between log ins), it may be easier to detect compromised accounts.

In another embodiment, the network latency determinations may be used for managing effectiveness of infrastructure upgrades based on network latency before and after the upgrade. For example, new servers, or some other network resources can be added to email infrastructure in a particular region. Network latencies can be determined before and after the upgrades to see what affect, if any, the upgrades had to the system. Further, this information can be retained and used for future planning of upgrades to the email infrastructure. Additionally, the network latencies can be periodically checked for an area, region, or country to see if upgrades may be needed or planned for within a period of time, based on network latency history and projections, for example.

At 212 in the exemplary method 200, a connection bandwidth, such as for the connection between the client and the remote server in a domain of a network (e.g., for a network bandwidth), is determined. The connection bandwidth comprises an amount of data (e.g., a maximum amount of data) that can be sent over a connection at any one time, for example. Further, in one embodiment, a plurality of connection bandwidths can be determined for a plurality of connections between clients and remote servers for a network in an email infrastructure to determine the network's bandwidth capacity. As an example, a plurality of connections in a specific area, region, country, or for the entire network can be gathered to determine particular network bandwidths.

At 214, determining the connection bandwidth comprises determining a second amount of time, which comprises how long it takes for an email response to be received by the browser for an email request from the browser to a remote server. For example, when a user logs onto an Internet-based email system, they may see a list of unread emails in their "in-box." The user can select an unread email to read, often by "clicking" on the email (e.g., selecting it with the mouse or some other technique available for the computing device used). In one embodiment, selecting the unread email for reading can comprise an "email request," as described above, and an amount of time it takes for the email to be loaded to the browser from the remote server (e.g., the email response) comprises the second amount of time.

In another embodiment, the email request may comprise sending an email. For example, the user may compose an email message locally (e.g., on the client) and send the email out (e.g., by "clicking" on a send button in the browser). In this embodiment, sending out the email is the email request, for example, and the second amount of time can comprise the time is takes for the email message to be uploaded to the remote server from the client (e.g., the email response). Therefore, as an example, a timer can be started when the "send" button is "clicked," and stopped when the email message is completely uploaded to the remote server, thereby recording an amount of time it takes to upload an email message (e.g., the second amount of time).

In another embodiment, the email request may comprise requesting an upload of an email attachment to the remote server, or requesting a download of an email attachment from the remote server. For example, a user may wish to attach a file, such as an image or document, to an email they are sending out. In this example, in order to attach the file to the email for an Internet-based email system, the file is uploaded to the remote server in the email infrastructure from the user's storage location of the file on their client. Further, as an example, the user may receive an email message that has a file attached that they wish to access (e.g., read or store locally). In this example, for an Internet-based email system, the file is downloaded from the remote server to the user's client.

In this embodiment, the user can initiate the upload or download of the file (e.g., by selecting or clicking on "attach file" or "download file" in the browser), for example, thereby initiating the "email request," and a timer can be started. When the file is completely uploaded to the remote server (e.g., completing the email response), for an upload, or the file is completely downloaded to the client, for a download, the timer can be stopped. In this way, in this example, the second amount of time comprises an amount of time it takes to completely upload or download a file to/from the remote server in the email infrastructure.

At 216, in the exemplary method 200, the size of the email response from the remote server is identified. For example, if the email request is a file download, the size of the downloaded file is identified (e.g., a five Mb photo). In this example, the file size identification can be performed by the browser or some other component on the client. At 210, the connection bandwidth is determined by combining the size of the response (e.g., file, email, etc.) with the determined second time (e.g., time between email request and email response). In one embodiment, a resulting connection bandwidth may be represented in an amount of data per time, such as bytes per second (e.g., ten megabytes per millisecond (10 Mb/Msec)).

Having determined the connection bandwidth, and/or determined the network latency, the exemplary method ends at 220.

In one aspect, a plurality of connection bandwidths can be determined, such as from a plurality of clients connected to one or more servers in the email infrastructure. In this way, in one embodiment, a connection bandwidth can be determined using the plurality of connection bandwidths, which can comprise a bandwidth of the network for a region, a country or the entire system. As an example, the connection bandwidths can be determined for the clients that connect to servers in a regional data center for the email infrastructure. In this example, these connections may represent the network for the region, therefore, the collection of the plurality of bandwidth connections can be used to represent the network bandwidth for that region.

Further, in this aspect, a network bandwidth for an area, region, country, or more, may be used for a number of purposes. In one embodiment, a network bandwidth may be used to determine what type of content to provide users in a particular area. For example, a first region may have a higher bandwidth than a second region, therefore, richer content (e.g., having more data requirements such as video) may be provided to the first region in the email infrastructure than to the first region. In this example because the greater bandwidth of the first region can allow for the email services not to experience slow retrieval times, as may occur if the same content was provided to the second region.

In another embodiment, the combination of connection bandwidths and number of unique anonymous users behind an IP address can help determine different user scenarios. For example, a few users behind one IP address may be a home or a small business. However, hundreds of users behind the same IP address is likely to be a Corporate Firewall scenario. As another example, a user behind multiple IP addresses over some reasonable time may be either a traveling user or a user behind dynamic IP addresses. However, if they are behind multiple IP addresses within a short period of time at great distances apart they are likely to be hackers, which may be confirmed by applying further heuristics.

Further, the connection bandwidths may be used to test effectiveness of any particular infrastructure upgrades, such as adding more server or rerouting connections, based on a bandwidth before and after the upgrades. Additionally, planning infrastructure upgrades may benefit from evaluating network bandwidths, for example, to find degradation trends in bandwidths, where upgrades may be needed.

Also, in one aspect, data that is sent between a client and remote server can be compressed or uncompressed. That is, for example, data is often compressed (e.g., using one or more of a plurality of available data compression techniques) in order to create files or packets of data that are smaller, thereby allowing more data to be sent in a same amount of time compared to uncompressed data. As an example, images are often compressed by default. Further, text, HTML, JavaScript and Style Sheet Files are compressible. Browsers and servers typically compress and decompress compressible files "on the fly" to minimize the traffic sent over the wire (e.g., the internet). Images typically need no further compression as they are usually already compressed natively (e.g., locally when created). In this aspect, in one embodiment, determining the connection bandwidth may be different when the email response (e.g., the uploaded/downloaded file is completed, or the email is sent/received) is compressed than when it is uncompressed. In this embodiment, for example, the difference can be used to measure effectiveness of compression in transferring data between clients and servers either way.

In this embodiment, a compressed connection bandwidth can be determined when the email response is compressed, and an uncompressed connection bandwidth can be determined when the email response is uncompressed. As an example, data that is sent to a client from the remote server may be compressed prior to sending and uncompressed when it is received at the client. In this example, the time it takes to send the compressed data may be affected by the compression and decompression that happens before and after sending the e-mail, which can also be used to measure the effectiveness of data compression for different types of files.

In one embodiment, email messages (e.g., usually text-based, which are highly compressible), such as when sending or retrieving, may be used to test uncompressed connection bandwidths, while uploading/downloading attachments, such as images, may be used to test compressed connection bandwidths. For example, an email message is typically highly compressible text-based data, which is compressed by the browser before sending over the wire (e.g., Internet) and then decompressed by the recipient—the remote server and vice versa when reading an e-mail. As another example, the email attachments, such as images and compressed documents, are often natively compressed and bigger in size, which lend themselves to more accurate measurements of connection bandwidths.

Figure 3:
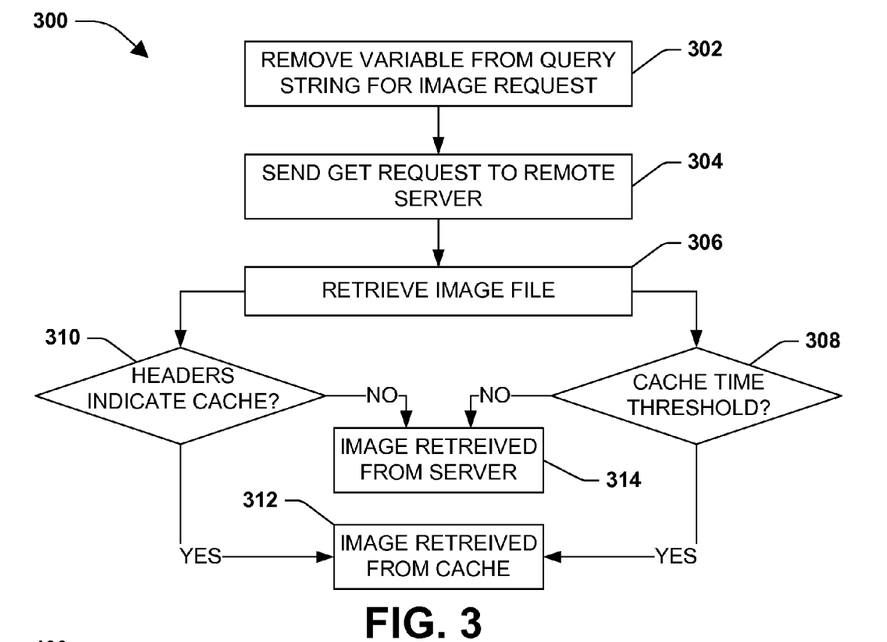
FIG. 3 is a flow diagram illustrating an exemplary embodiment of an implementation of one or more of the techniques described herein.

FIG. 3 is a flow diagram illustrating an exemplary embodiment 300 of an implementation of one or more of the techniques described herein. In another aspect, the technique for mitigating cached response retrievals (cache buster), as described above, by adding a randomly generated variable to a query string for a get request, for example, can also be utilized to determine if a client has visited an email system. That is, in one embodiment, the cache buster can be turned off, and the results examined.

Figure 4:
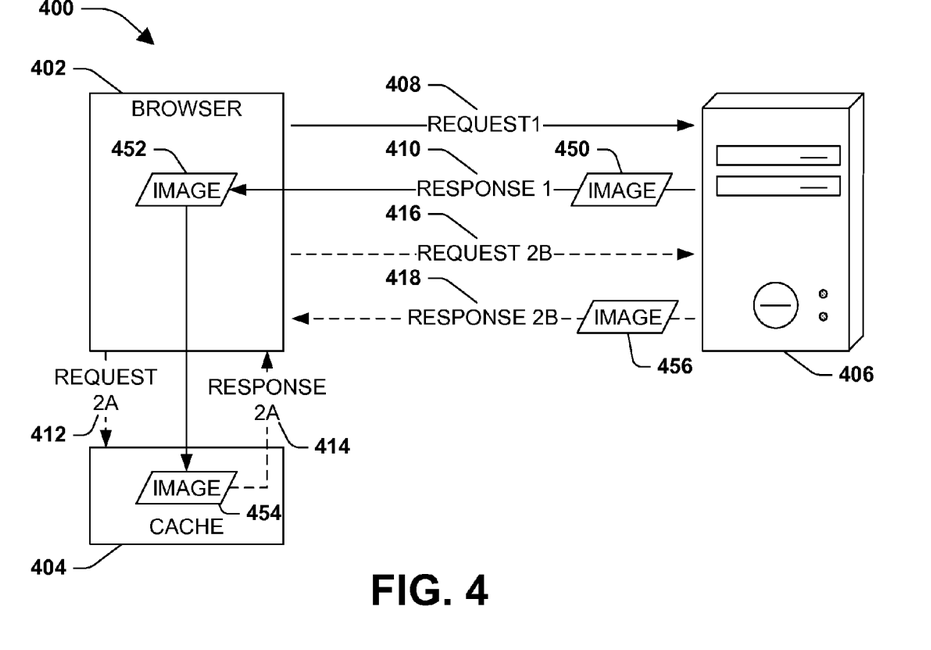
FIG. 4 is component diagram illustrating an exemplary embodiment of an implementation of one or more of the techniques described herein.

For example, with reference to FIG. 4 for illustrative purposes, a user may have previously logged into the email system, whereby a get request for the test file (e.g., 408), such as a tiny image file (e.g. much less than 1 Kb in size), was sent out in order to test the network latency. In this example, the remote server sent a response (e.g., 410) that comprises the test file (e.g., image file, 450). The browser (e.g., 402) on the client-side receives the test file and stores it in the browser's local cache of the client (e.g., 404).

In FIG. 3, at 302, the randomly generated variable is removed, or alternately, not added to the browser query string for the get request for the test file hosted on the remote server. That is, as an example, when the user logs onto the email service, the cache buster is turned off for the get request so that the request goes out as it might without the cache buster activated. At 304, the get request for the test file is sent out by the browser on the client. And the test file, such as an image file, can be retrieved at 306.

However, the image file may be retrieved from one of two places depending on whether the user has previously logged onto the email system, for example. As an illustrative example, the client may first check to see (e.g., request 2A, 412) whether the requested image file is stored in the local cache (e.g., 404), and if stored in the local cache, a response (e.g., 414) can be sent back to the browser comprising the image (e.g., 454) from the local cache 414, without the get request going out to the remote server (e.g., the object is served locally from the user's browser cache). However, if the image is not found in the local cache, in this example, a request (e.g., 416) is sent to the remote server (e.g., 406) for the image, and the remote server responds (e.g., 418) with the image (e.g., 456).

In the exemplary embodiment, 300, at 308, determining where the test file was retrieved from cache can comprise determining how much time it took to retrieve the test file, then comparing the time to a threshold time value. For example, if the image file is found in the local cache it typically takes less time (e.g., measured in milliseconds) than retrieving it from the remote server (e.g., measured in seconds). In this example, if the time between the sending of the get request until the time the browser receives the file is within a threshold time that is typical for the retrieval from the local cache, at 312, the image file is determined to have been retrieved from the cache (e.g., which means the user had visited this site before). In this way, for example, it can be determined that the client has visited the email system previously due to the cached test file. Alternately, at 308, if the time does not meet the threshold, the test file was retrieved from the remote server, at 314, and the client has not visited the email system (e.g., or may have a cleared cache).

Further, at 310, the response to the get request can comprise headers that indicate from where the response was sent, along with the test file. For example, the headers may indicate that the response, comprising the test file, came from the remote server, at 314. Therefore, the client has not visited the email system. Alternately, checking the response headers may indicate that the response did not come from the remote server, therefore the test file was retrieved from local cache, at 312. In this example, the client has likely visited the email system previously, due to the test file being found in the local cache, which can be shown by the headers.

Figure 5:
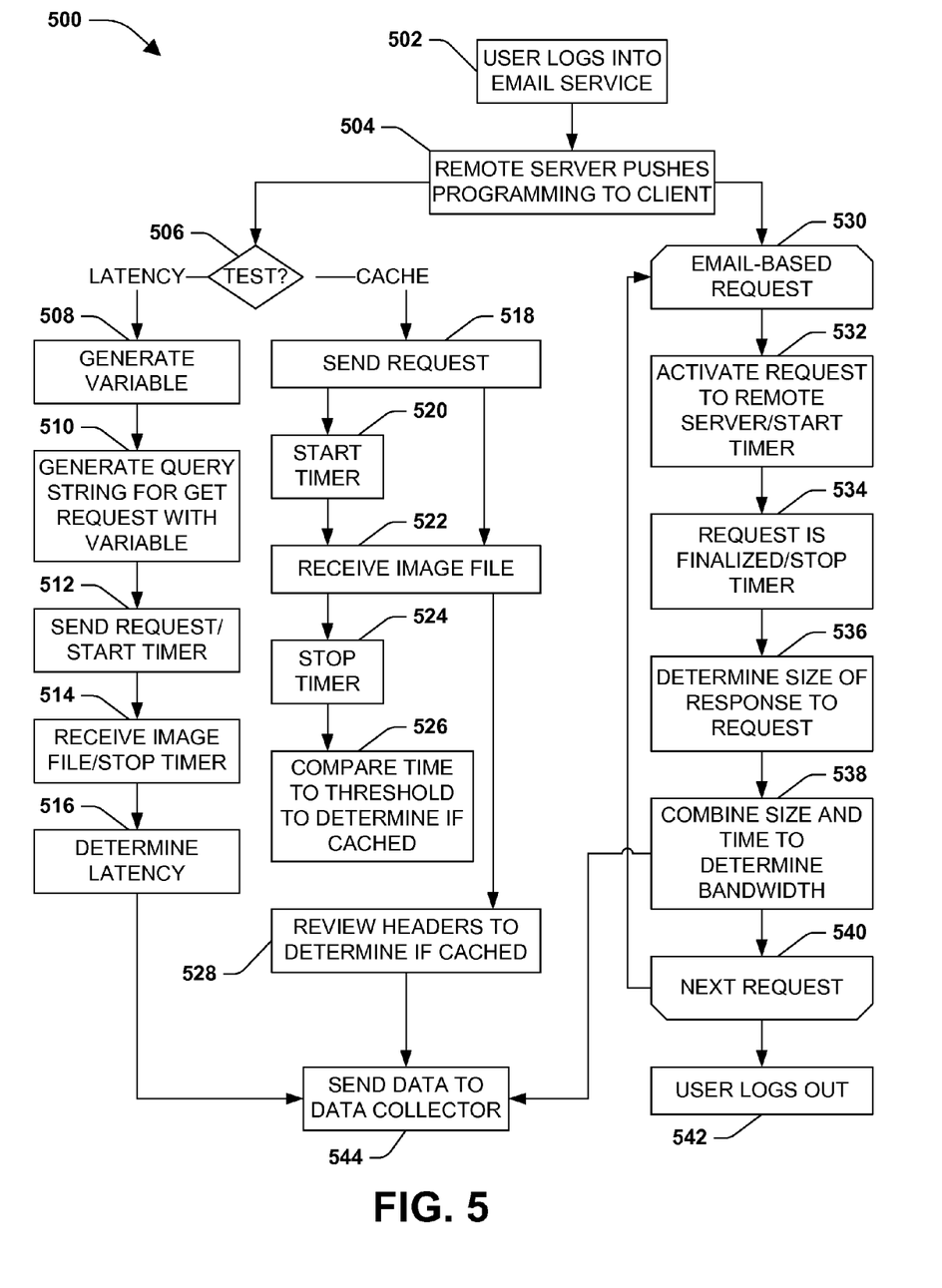
FIG. 5 is a flow diagram illustrating an exemplary embodiment of an implementation of one or more of the techniques described herein.

FIG. 5 is a flow diagram illustrating an exemplary embodiment 500 of an implementation of one or more of the techniques described herein. At 502, a user logs in to the email service from their client. The remote server, onto which the user logs, pushes code to the client, through the browser, that allows the client (e.g., the browser on the client) to determine an amount of time, such as for timing the responses, etc., and/or add the randomly generated variable to the browser query string, such as to mitigate cache retrieval of the test file.

In this embodiment, 500, when the user first logs into the email service, at 506, one or more tests can be performed. To determine whether the client has a cached or uncached experience, at 518, the cache buster can be turned off and a request for a test image file can be sent out by the browser. In one embodiment, the timer can be started, at 520, if the threshold time value is to be used to determine the cached experience. The image file is received at 522, and in one embodiment, the timer is stopped.

In this embodiment, the time recorded by the timer is compared against a threshold value that indicates whether the image was retrieved from the local cache or remotely, at 526. In another embodiment, at 528, the headers from the response are checked to see if they indicate that the image file came from the remote server or not. At 544, the information that indicates whether the client has previously logged into the email service or not, can be sent to a data collector, such as on a remote server in the email infrastructure.

Relatively sequentially, relatively concurrently, or separately a latency test can be performed. At 508, a random variable is generated, such as by the code pushed to the browser from the remote server. The variable is added to a browser query string for the test image file, sent out by the get request. Upon sending the get request, at 512, the timer is started. At 514, when the response comprising the image file is received, the timer is stopped and the time recorded.

The latency for the connection between the client and remote server is determined by using the recorded time for the response, at 516. At 544, the latency for the connection is sent to the data collector for the email system. It will be appreciated that merely anonymous information is sent to the data collector. That is, only data that indicates the network latency, such as a time, between an anonymous IP address and the remote server is sent to the data collector. In one embodiment, a range of IP addresses can be used that does not identify any particular user information. In this way, no personally identifiable information or other user identifiable information can be gathered and used by the email service.

In this embodiment 500, the latency testing is merely performed once per user session (e.g., each time the user logs into the email service). However, at 530, the bandwidth connection testing can be performed for respective email requests. An email request is made, such as an email read/send or an attachment upload/download, and at 532, the request is activated and the timer started. For example, upon clicking a "send" email button on the browser's user interface, the send email request is activated and timing begins.

At 534, the request is finalized by a response, such as the email being received by the remote server, or the attachment being uploaded to the remote server, and the timer is stopped. A size of the response (e.g., the uploaded/downloaded attachment) is identified, at 536, and combined with the time recorded by the timer to determine the connection bandwidth, at 538. For example, if the size of the response is 10 Mb and the timer recorded one second, the bandwidth is estimated at 10 MB/sec.

At 544, the data comprising the bandwidth for this connection is sent to the data collector, as described above. At 540, the browser waits for the next email-based request, at 530. For example, a user may log into the email service and read each of the unread emails in the inbox, where each reading of an unread email can comprise an email-based request. One of the unread emails may comprise an attachment, which the user downloads to the client from the remote server. Further, in this example, the user may decide to send an email with an attachment.

In this example, the reading of emails, downloading the attachment, uploading another attachment and sending of the email can respectively comprise email-based requests for which a connection bandwidth test can be performed. Additionally, email-based requests can continue to be performed until the user logs out of the email service, at 542.

In one aspect, network latencies and/or connection bandwidths can be determined by sampling a user session in an email-based infrastructure. That is, in one embodiment, a sampling protocol may be developed for a particular purpose, where the network latencies and/or connection bandwidths are collected at different intervals and/or levels. As described above, the latencies and/or bandwidths can be used to identify client locations, determine static versus dynamic IP addresses, manage resources, and more. In one example, the sampling protocol may be used to identify a network latency for a server or group or servers that provide email services to an area, region or country. User sessions can be sampled, using the techniques described herein, to identify the latency for the network where the samples are collected from a plurality of clients, such as grouped into a range of IP addresses, which connect to the server(s) of interest.

Further, in one embodiment, a user session sampling level can be adjusted in the email-based infrastructure to a desired level based upon an instrumentation data-flow. For example, the data-flow for instrumentation utilized in the email infrastructure by the browser on a client can increase or decrease based on resource upgrades, outages, and other factors. In this embodiment, the sampling of user session can be adjusted (e.g., manually or automatically (programmatically) up or down based on the data-flow. For example, in smaller countries, a website implementing one or more of the systems and/or techniques described herein can turn on the instrumentation to 100%, where as in bigger countries 1% sampling may suffice.

Figure 6:
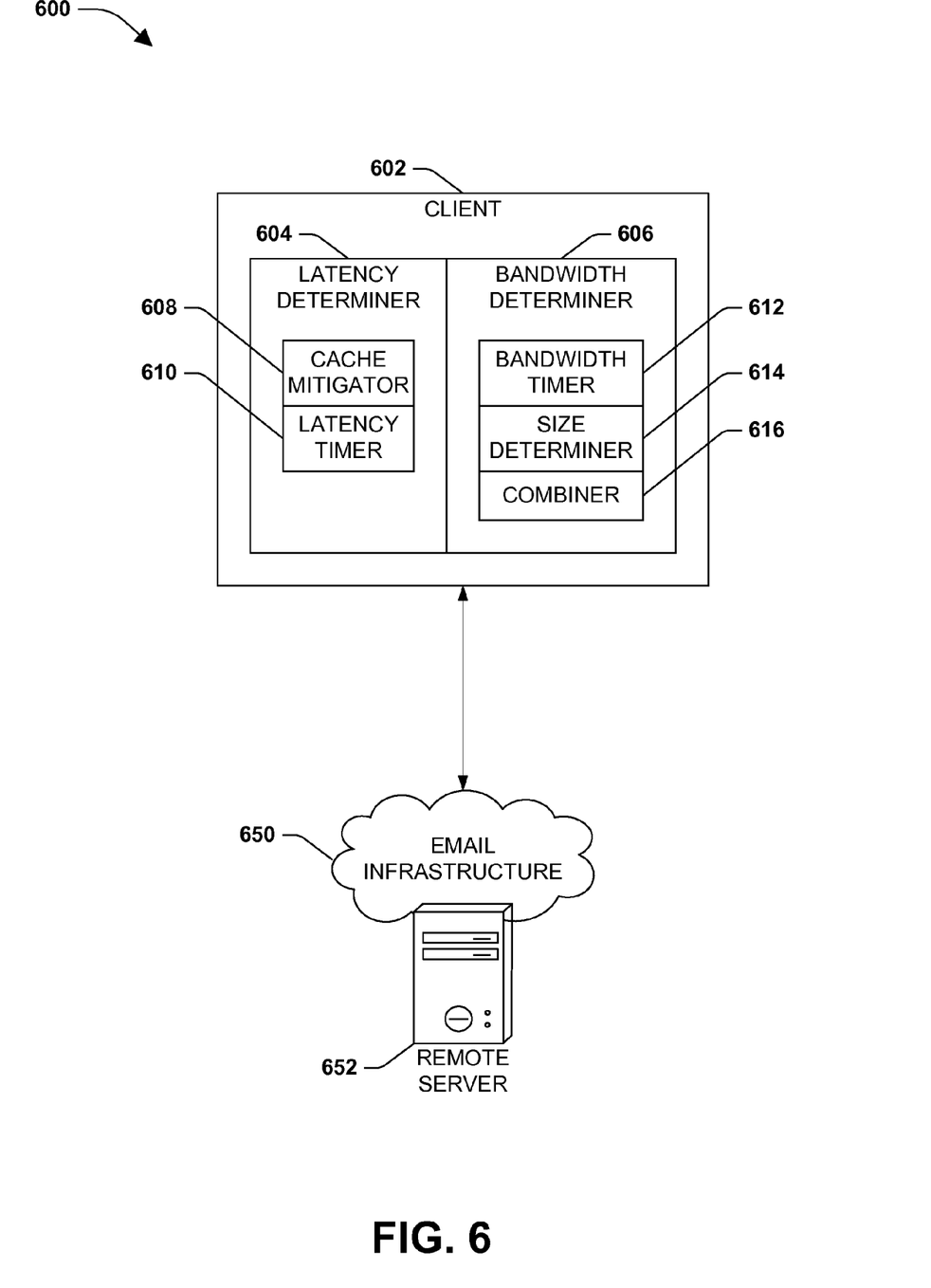
FIG. 6 is a component diagram of an exemplary system for measuring a client's network latency and the client's connection bandwidth.

A system may be devised that provides for measuring latencies and/or bandwidths for an Internet-based email system. FIG. 6 is a component diagram of an exemplary system 600 for measuring a client's network latency and the client's connection bandwidth. A network latency determination component 604 is disposed on a client machine 602, such as operable on a processor in the client. The network latency determination component 604 determines a network latency time between the client machine 602 and a remote server 652 in an email infrastructure 650.

The network latency determination component 604 comprises a cache mitigation component 608 that adds randomly generated variables to browser query strings for get requests, which comprise a request for a test file. The get requests go from the client machine 602 to the remote server 652, and the test file is of a size that allows it to fit on one response packet. Further, the randomly generated variable, provided by the cache mitigation component 608, mitigates a cache retrieval of the test file (e.g., retrieval of the test file from a local client cache rather than from the remote server).

The network latency determination component 604 further comprises a latency timing component 610 that determines a latency amount of time. The latency amount of time comprises an amount of time between when the get request is sent by the browser and the test file is received by the browser. As an example, the network latency determination component 604 may comprise a timer that starts when the request is sent and stops when the file is received, and records the time.

A connection bandwidth determination component 606 is disposed on the client machine 602, and it is used to determine a connection bandwidth between the client machine 602 and the remote server 652 in the email infrastructure 650. The connection bandwidth determination component 606 comprises a bandwidth timing component 612 used to determine a bandwidth amount of time. The bandwidth amount of time comprises an amount of time between activation of an email request involving the remote server and the response to the request. For example, a timer may be started when a request for uploading an attachment to an email is begun, and the timer can be stopped when the attachment is completely uploaded to the remote server 652.

The connection bandwidth determination component 606 further comprises a response size determination component 614 that identifies a size of the email response from the remote server, such as a size of the attachment to an email. In the connection bandwidth determination component 606, a combination component 616 determines the connection bandwidth by combining the size of the email response, from the size determination component 614, with the bandwidth amount of time from the bandwidth timing component 612. For example, the size of the email attachment may be 1 Mb, and the time for the upload may be 1 sec. In this example, the combination component 616 can determine that the connection bandwidth is 1 Mb/sec.

Figure 7:
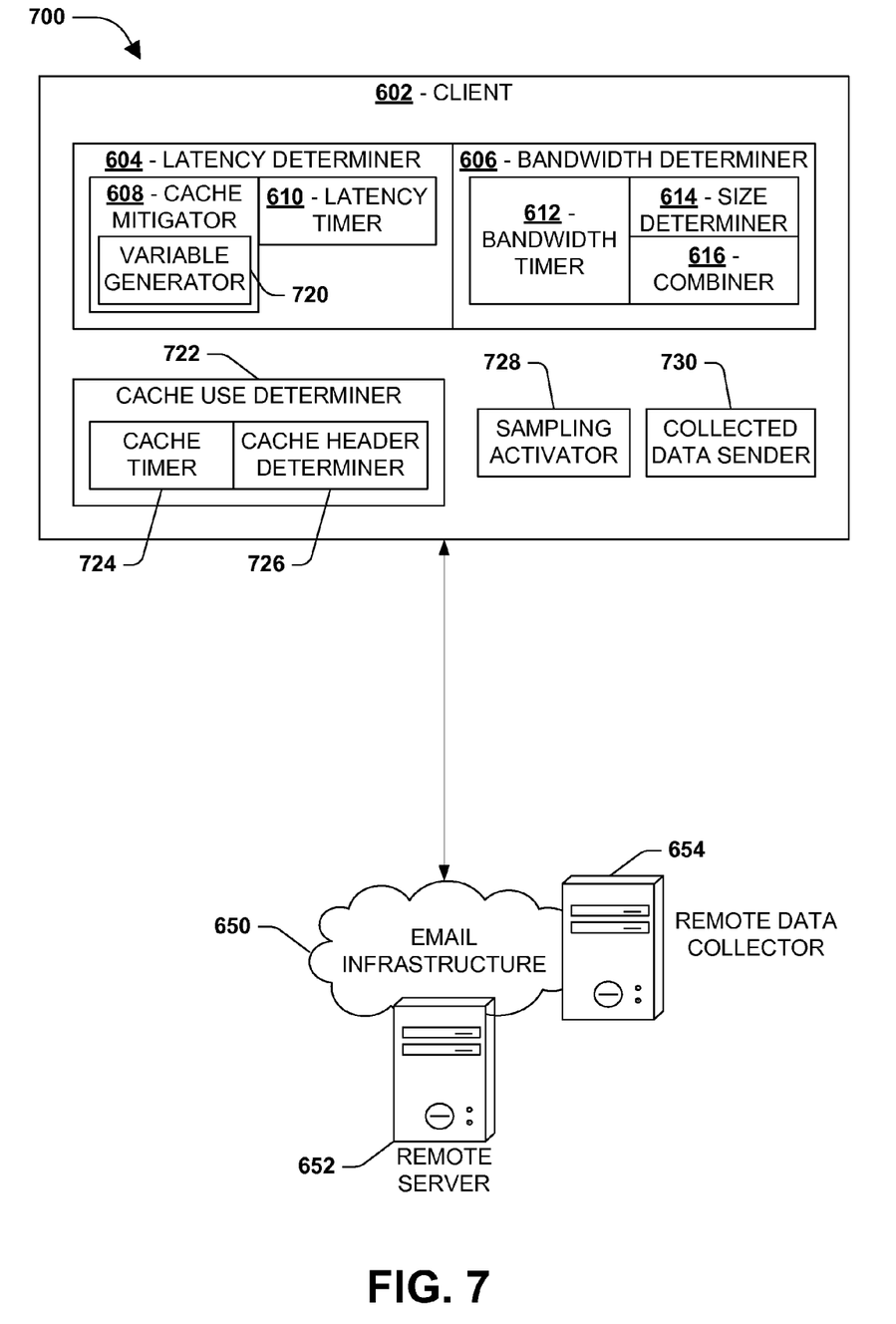
FIG. 7 is a component diagram illustrating an exemplary embodiment of an implementation of one or more of the systems described herein.

FIG. 7 is a component diagram illustrating an embodiment 700 of an implementation of one or more of the systems described herein. The cache mitigation component 608 comprises a random variable generation component 720 that generates the random variable to be added to the browser query string, such as for the get request for the test file from the remote server 652. That is, for example, when the browser generates a get request for the test file, such as an image, the random variable generation component 720 generates a random variable that is added to the request by the cache mitigation component 608. In this way, the client 602 can be forced to retrieve the test file from the remote server 652 instead of from local cache, for example, so that the request is made to the server to measure bandwidth, network latency and cached/uncached experience.

Further, in this embodiment 700, the network latency determination component 604 can be configured so that it merely determines the network latency time between the client machine and the remote server in the email infrastructure once for a user session on the client 602. Additionally, the connection bandwidth determination component 606 can be configured so that the connection bandwidth between the client machine 602 and the remote server in the email infrastructure is determined each time an email request is made from the client to the remote server 652.

A cache use determination component 722 is disposed in the client machine 602, and is used to detect whether a session on the client machine 602 is a cached experience or an uncached experience when the randomly generated variable is not added to the browser query string for the get request for the test file hosted on the remote server. That is, for example, if the cache mitigation component 608 is turned off, a random variable will not be added to a get request, thereby allowing the client to retrieve the test file from its local cache, if it is present. In this way, for example, if the test file is retrieved from local cache it may be assumed that the client machine 602 has logged into the email infrastructure 650 previously. As an example, this component can facilitate detecting whether a user visited the email site previously (or not) based on whether they have some/most of the files cached on their local browser cache.

In this embodiment 700, the cache use determination component 722 can comprise a cache timing component 724 that can determine whether the session comprised a cached experience if the latency amount of time (e.g., determined by the latency timing component 610) meets a cached experience threshold of time. That is, for example, a threshold can be set that reflects a typical amount of time for retrieving files from the local cache. If the latency amount of time meets the threshold, the cache use determination component 722 can determine that the file was retrieved from local cache; otherwise it can determine that the file came from the remote server 652.

Further, the cache use determination component 722 can comprise a cache header determination component 726 that determines whether the session comprised a cached experience if response headers from the email response (comprising the test file) indicate the response was from a local cache of the client machine. That is, for example, the response file, comprising the test file, can include headers that indicate from where it came. In this example, if the headers indicate that the response came from the remote server 652, it determines the test file was retrieved from the remote server and the local cache was not used for the request. Otherwise, the cache header determination component 726 determines that the response retrieved the test file from local cache.

A sampling activation component 728 can be configured to provide for remote activation and deactivation of the system. In one embodiment, a particular sampling protocol may be set up for the email infrastructure, such as to test a local server, where the protocol comprises a user sampling session for the client 602. The sampling activation component 728 can allow components of the system to be activated, for example, to test for connection bandwidth and/or latency. Further, a data collection sending component 730 can be used to send collected data to a remote data collector 654 for the email infrastructure 650. That is, connection bandwidths and/or latencies can be collected, such as for a sampling protocol, and used for configuring the email service, and/or adding or upgrading component in the email system based on the collected data. In one embodiment, sampling can be used to increase/decrease the data collected per country, server, cluster of servers, data centers, etc.

Figure 8:
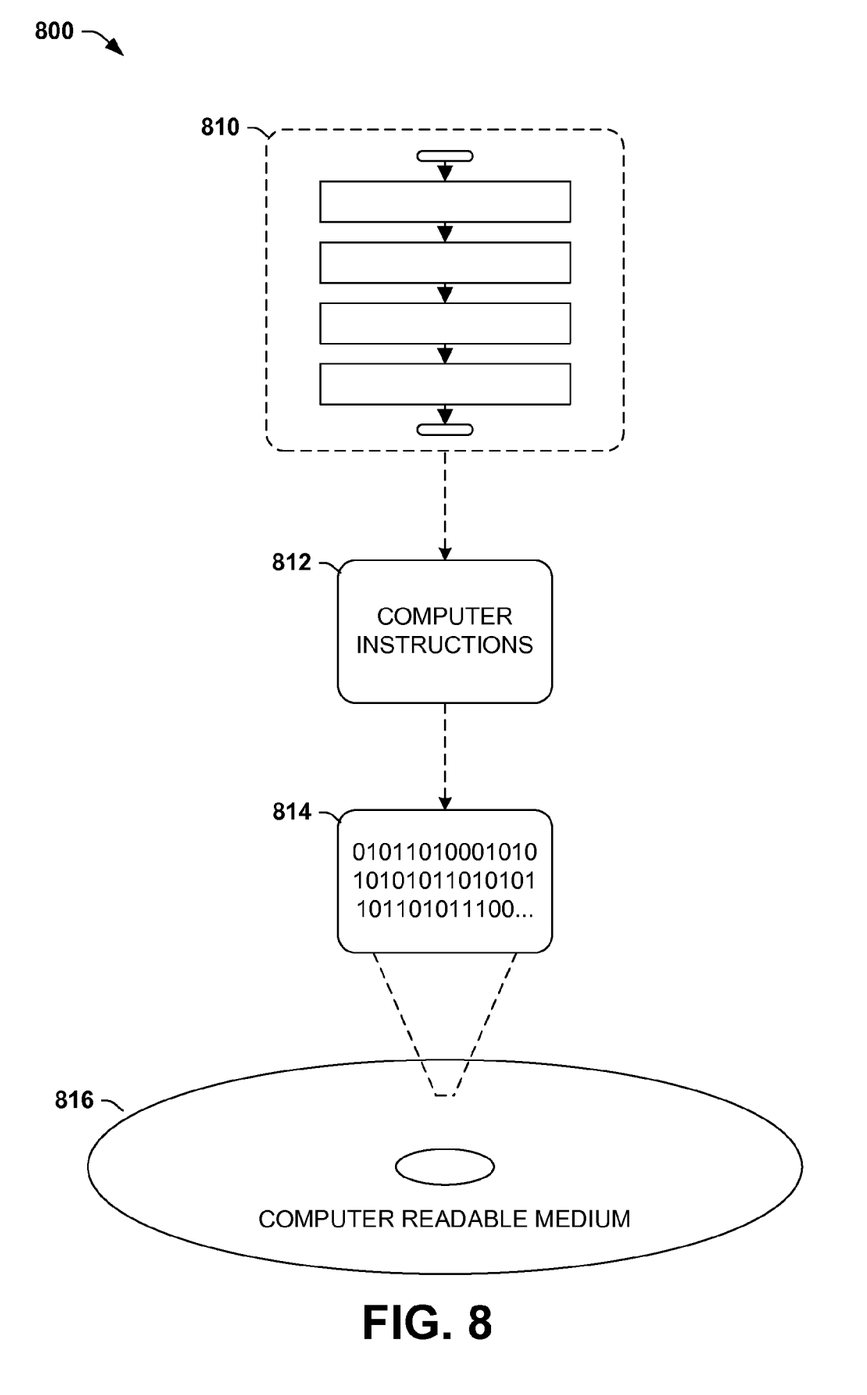
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 814. This computer-readable data 814 in turn comprises a set of computer instructions 812 configured to operate according to one or more of the principles set forth herein. In one such embodiment 810, the processor-executable instructions 812 may be configured to perform a method, such as the exemplary method 200 of FIG. 2, for example. In another such embodiment, the processor-executable instructions 812 may be configured to implement a system, such as the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
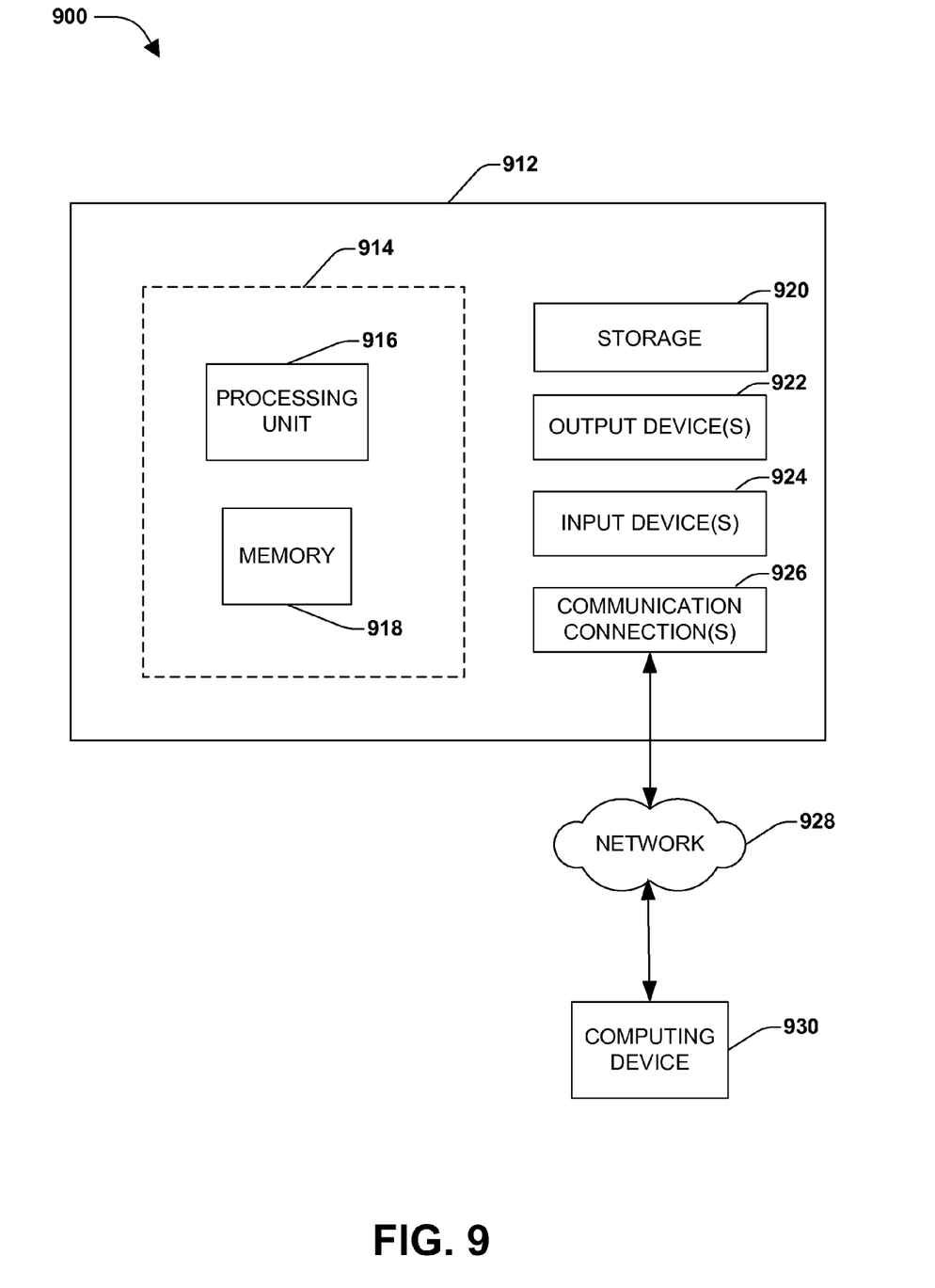
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for measuring at least one of latency or bandwidth, comprising:
   determining whether a client has previously visited a first remote server, comprising:
      issuing a first get request for a first test file hosted on the first remote server;
      receiving the first test file in response to the first get request; and
      determining that the client has previously visited the first remote server when at least one of:
         a first amount of time between when the first get request was issued and the first test file was received is less than a specified amount of time; or
         a header of the received first test file indicates that the first test file was not received from the first remote server; and
   at least one of:
      determining a network latency, comprising:
         issuing a second get request for a second test file hosted on a second remote server, a browser query string for the second get request comprising a randomly generated variable configured to mitigate cache retrieval of the second test file;
         receiving the second test file in response to the second get request; and
         measuring a second amount of time between when the second get request was issued and the second test file was received; or
      determining a connection bandwidth, comprising:
         issuing a request, to a third remote server, for a response;
         receiving the response in response to the request;
         measuring a third amount of time between when the request for the response was issued and the response was received;
         identifying a size of the response; and
         using the third amount of time and the size of the response to determine the connection bandwidth.

2. The method of claim 1, the first remote server and the second remote server comprising a same remote server.

3. The method of claim 1, the first remote server comprising an email system.

4. The method of claim 1, comprising:
   sending, to a data collector, visit information pertaining to whether the client has previously visited the first remote server:
      latency information pertaining to the determined network latency.

5. The method of claim 4, the sending visit information and latency information comprising:
   sending the visit information and the latency information to the data collector anonymously.

6. The method of claim 1, comprising:
   determining latency information from a spatial region within which the client is located.

7. The method of claim 1, the first test file comprising a test file that fits in one response packet.

8. The method of claim 1, the first test file comprising an image file that is up to 1 kilobyte in size.

9. The method of claim 1, the request comprising an email request.

10. The method of claim 1, the determining a connection bandwidth comprising:
    determining a compressed connection bandwidth if the response comprises compressed data; and
    determining an uncompressed connection bandwidth if the response comprises uncompressed data.

11. The method of claim 1, the determining a connection bandwidth comprising:
    determining a compressed connection bandwidth and an uncompressed connection bandwidth; and
    comparing the compressed connection bandwidth to the uncompressed connection bandwidth to determine an effectiveness of compression in transferring data between the client and the third remote server.

12. A system for measuring at least one of latency or bandwidth, comprising:
one or more processing units; and
memory comprising instructions that when executed by at least some of the one or more processing units, perform actions comprising:
  determining whether a client has previously visited a first remote server, comprising:
    issuing a first get request for a first test file hosted on the first remote server;
    receiving the first test file in response to the first get request; and
    determining that the client has previously visited the first remote server when at least one of:
      a first amount of time between when the first get request was issued and the first test file was received is less than a specified amount of time; or
      a header of the received first test file indicates that the first test file was not received from the first remote server; and
  at least one of:
    determining a network latency, comprising:
      issuing a second get request for a second test file hosted on a second remote server, a browser query string for the second get request comprising a randomly generated variable configured to mitigate cache retrieval of the second test file;
      receiving the second test file in response to the second get request; and
      measuring a second amount of time between when the second get request was issued and the second test file was received; or
    determining a connection bandwidth, comprising:
      issuing a request, to a third remote server, for a response;
      receiving the response in response to the request;
      measuring a third amount of time between when the request for the response was issued and the response was received;
      identifying a size of the response; and
      using the third amount of time and the size of the response to determine the connection bandwidth.

13. The system of claim 12,
the first remote server and the second remote server comprising a same remote server.

14. The system of claim 12, the second remote server comprising an email system.

15. The system of claim 12, the actions comprising:
sending, to a data collector, visit information pertaining to whether the client has previously visited the first remote server and
latency information pertaining to the determined network latency.

16. The system of claim 15, the sending visit information and latency information comprising:
sending the visit information the latency information to the data collector anonymously.

17. The system of claim 15, the actions comprising:
utilizing the visit information and the latency information to
determine an effectiveness of infrastructure upgrades.

18. The system of claim 12, the determining a connection bandwidth comprising:
determining a compressed connection bandwidth and an uncompressed connection bandwidth; and
comparing the compressed connection bandwidth to the uncompressed connection bandwidth to determine the effectiveness of compression in transferring data between the client and the third remote server.

19. A method for measuring at least one of latency or bandwidth of an email system, comprising:
receiving network information from a client, the network information comprising visit information pertaining to whether the client has previously visited the email system and at least one of latency information indicative of a network latency between the email system and the client or bandwidth information indicative of a bandwidth connection between the email system and the client,
  the visit information generated by:
    issuing a first get request for a first test file hosted on the email system;
    receiving the first test file in response to the first get request; and
    determining that the client has previously visited the email system when at least one of:
      a first amount of time between when the first get request was issued and the first test file was received is less than a specified amount of time; or
      a header of the received first test file indicates that the first test file was not received from the email system;
  the latency information generated by:
    issuing a second get request for a second test file hosted on the email system, a browser query string for the second get request comprising a randomly generated variable configured to mitigate cache retrieval of the second test file;
    receiving the second test file in response to the second get request; and
    measuring a second amount of time between when the second get request was issued and the second test file was received; and
  the bandwidth information generated by:
    issuing a request, to the email system, for a response;
    receiving the response in response to the request;
    measuring a third amount of time between when the request for the response was issued and the response was received;
    identifying a size of the response; and
    using the third amount of time and the size of the response to determine the connection bandwidth.

20. The method of claim 19, comprising combining the network information from the client with network information from at least one other client to estimate at least one of latency or bandwidth of the email system.

* * * * *